United States Patent [19]

Togino

[11] Patent Number: 4,540,248
[45] Date of Patent: Sep. 10, 1985

[54] OBJECTIVE LENS SYSTEM FOR MICROSCOPES

[75] Inventor: Takayoshi Togino, Tokyo, Japan

[73] Assignee: Olympus Optical Co., Ltd., Tokyo, Japan

[21] Appl. No.: 586,148

[22] Filed: Mar. 5, 1984

[30] Foreign Application Priority Data

Mar. 24, 1983 [JP] Japan .................. 58-47916

[51] Int. Cl.³ .............................. G02B 21/02
[52] U.S. Cl. .............................. 350/414
[58] Field of Search ..................... 350/464, 414

[56] References Cited

U.S. PATENT DOCUMENTS

| | | | |
|---|---|---|---|
| 3,525,562 | 8/1970 | Klein | 350/414 |
| 4,231,637 | 11/1980 | Sussman | 350/414 |
| 4,261,654 | 4/1981 | Rybicki | 350/414 |
| 4,384,765 | 5/1983 | Danner | 350/414 |

FOREIGN PATENT DOCUMENTS 42-11033 6/1967 Japan.
50-30466 10/1975 Japan.

*Primary Examiner*—John K. Corbin
*Assistant Examiner*—Scott J. Sugarman
*Attorney, Agent, or Firm*—Cushman, Darby & Cushman

[57] ABSTRACT

An objective lens system for microscopes comprising a first positive lens component, a second positive cemented doublet, a third lens unit comprising at least one cemented lens, a fourth meniscus cemented doublet having a convex surface on the object side and a fifth negative cemented doublet. Said objective lens system has a working distance longer than twice of its focal length and an image surface which is flat over a wide range up to a field number of 27.

6 Claims, 5 Drawing Figures

OBJECTIVE LENS SYSTEM FOR MICROSCOPES

BACKGROUND OF THE INVENTION (a) Field of the Invention

The present invention relates to an objective lens system for microscopes having a magnification level on the order of 50X, an especially long working distance and a flat image surface.

(b) Description of the Prior Art

As the conventional objective lens systems for microscopes having flat image surfaces, there have already been known a lens system comprising a meniscus lens component having a concave surface with high curvature on the object side as the first lens component arranged on the extreme object side and another lens system comprising a meniscus lens component having a concave surface on the image side as the lens component arranged on the extreme image side.

Further, there have been known objective lens systems for microscopes adopting the Gauss type for prolonging working distances. As an example of the objective lens systems of this type, there has been known the lens system comprising seven components of nine elements disclosed by Japanese examined published patent application No. 30466/75.

However, an objective lens system comprising seven components nine elements like the above-mentioned conventional example has a working distance approximately 70% of its focal length, i.e., a working distance shorter than 3 mm when it has a focal length, for example, of 4 mm. The working distance of such an objective lens system for microscopes is insufficient for machining small specimens while observing them at factories. In order to prolong the working distance, the first lens component must have a stronger refractive power. However, when the first lens component has a stronger refractive power, its surface has a smaller radius of curvature, thereby aggravating spherical aberration and chromatic aberration. When it is attempted to correct these aberrations with the other lens components, it will be difficult to correct curvature of field, coma and so on.

For the reason described above, there have conventionally been obtainable no objective lens system for microscopes which has a long working distance and, at the same time, a flat image surface over a wide visual field.

SUMMARY OF THE INVENTION

A general object of the present invention is to provide an objective lens system for microscopes having a working distance of at least 8 mm or twice of its focal length and an image surface which is flat over a wide range up to a field number of 27.

In order to obtain an objective lens system for microscopes having a long working distance, it is necessary to shift the principal point on the object side and, therefore, arranged a lens component having a strongly negative power on the image side. Accordingly, in the lens system according to the present invention, a lens component having a surface with strongly negative power is arranged on the image side and three or more lens components are arranged on the object side. Further, the present invention has succeeded in obtaining super-long working distance while favorably correcting aberrations in the lens system by arranging a lens component having two nearly aplanatic surfaces as the first lens component.

The objective lens system for microscopes according to the present invention comprises a first positive meniscus lens component I having a concave surface on the object side, a second cemented doublet component II, a third lens unit III comprising at least one cemented lens, a fourth meniscus cemented doublet component IV having a strongly concave surface on the image side and a fifth negative cemented doublet component V. Further, the objective lens system for microscopes according to the present invention is so designed as to astisfy the following conditions (1) through (4):

$$1.65 < n_{I-1} \quad (1)$$

$$-4.0f < r_{I-2}/(n_{I-1} - 1) < -2.0f \quad (2)$$

$$d_{I-1} < 1.5f \quad (3)$$

$$1.8f < r_{IV-3}/(n_{IV-2} - 1) < 2.2f \quad (4)$$

wherein the reference symbols are defined as follows:
f: focal length of the objective lens system as a whole
$n_{i-j}$: refractive index of the j th lens element of the i th lens component
$\nu_{i-j}$: Abbe's number of the j th lens element of the i th lens component
$r_{i-j}$: radius of curvature of the j th surface of the i th lens component
$d_{i-j}$: airspace reserved between the j th and j+1 th surfaces of the i th lens component Out of the conditions mentioned above, the condition (1) has been adopted to correct spherical aberration. If the lower limit of this condition is exceeded, spherical aberration is produced remarkably by the first lens component I and cannot be corrected by the other lens components.

The condition (2) has been selected also for correcting spherical aberration. If the upper or lower limit of this condition is exceeded, curvature of the surface $r_{I-2}$ will be far from the aplanatic condition and, accordingly, spherical aberration is aggravated too much to be corrected by the other lens components.

The condition (3) has been adopted to obtain a long working distance. If the upper limit of the condition (3) is exceeded, curvature of field will be reduced but working distance will undesirably be shortened.

The condition (4) has been selected for correcting curvature of field. If the upper limit of this condition is exceeded, Petzval's sum will be increased and flatness of the image surface will be degraded too much to be corrected by the other lens component. If the lower limit of the condition (4) is exceeded, in contrast, Petxval's sum will be reduced but coma will be aggravated, thereby making it impossible to maintain good balance of aberrations.

In addition to the conditions described above, the following condition (5) should desirably be satisfied for correcting chromatic aberration more favorably:

$$\nu_{II-p}, \nu_{III-p} \geq 80 \quad (5)$$

wherein the reference symbol $\nu_{i-p}$ represents Abbe's number of the positive lens element arranged in the i th lens component.

If this condition (5) is not satisfied, it is impossible to correct chromatic aberration sufficiently favorably in the objective lens system according to the present invention.

DETAILED DESCRIPTION OF THE PREFERRED EMBODIMENTS

Now, numerical data will be described below as preferred embodiments of the objective lens system for microscopes according to the present invention.

Embodiment 1
$f = 1$, $NA = 0.55$, $WD = 2.529$, $\beta = -50X$
$r_1 = -5.1445$
  $d_1 = 0.7502$  $n_1 = 1.8830$  $\nu_1 = 40.76$
$r_2 = -2.6127$
  $d_2 = 0.0556$
$r_3 = 9.4957$
  $d_3 = 0.3890$  $n_2 = 1.6510$  $\nu_2 = 56.15$
$r_4 = 3.9786$
  $d_4 = 1.3337$  $n_3 = 1.4339$  $\nu_3 = 95.15$
$r_5 = -3.9786$
  $d_5 = 0.0417$
$r_6 = 8.5713$
  $d_6 = 0.3890$  $n_4 = 1.7400$  $\nu_4 = 31.70$
$r_7 = 3.6432$
  $d_7 = 1.0003$  $n_5 = 1.4339$  $\nu_5 = 95.15$
$r_8 = -8.7233$
  $d_8 = 0.0417$
$r_9 = 4.5349$
  $d_9 = 1.1114$  $n_6 = 1.4339$  $\nu_6 = 95.15$
$r_{10} = -4.0600$
  $d_{10} = 0.3334$  $n_7 = 1.6765$  $\nu_7 = 37.50$
$r_{11} = 11.4976$
  $d_{11} = 0.0417$
$r_{12} = 2.0283$
  $d_{12} = 1.5282$  $n_8 = 1.4970$  $\nu_8 = 81.61$
$r_{13} = -3.5343$
  $d_{13} = 1.0044$  $n_9 = 1.5268$  $\nu_9 = 51.12$
$r_{14} = 1.0081$
  $d_{14} = 1.7827$
$r_{15} = -36.1998$
  $d_{15} = 0.2223$  $n_{10} = 1.6779$  $\nu_{10} = 55.33$
$r_{16} = 1.1298$
  $d_{16} = 0.4724$  $n_{11} = 1.7847$  $\nu_{11} = 25.71$
$r_{17} = 3.2370$ $r_{I-2}/(n_{I-1} - 1) = r_2/(n_1 - 1) = -2.959$
$r_{IV-3}/(n_{IV-2} - 1) = r_{14}/(n_9 - 1) = 1.914$
$d_{I-1} = d_1 = 0.7502$
$n_{I-1} = n_1 = 1.8830$
$\nu_{II-p} = \nu_3$
$\nu_{III-p} = \nu_5, \nu_6$ Embodiment 2
$f = 1$, $NA = 0.55$, $WD = 2.547$, $\beta = -50X$
$r_1 = -4.4649$
  $d_1 = 0.5559$  $n_1 = 1.8830$  $\nu_1 = 40.76$
$r_2 = -2.3644$
  $d_2 = 0.0278$
$r_3 = 7.0069$
  $d_3 = 0.3891$  $n_2 = 1.7000$  $\nu_2 = 48.08$
$r_4 = 3.4925$
  $d_4 = 1.2507$  $n_3 = 1.4339$  $\nu_3 = 95.15$
$r_5 = -3.6381$
  $d_5 = 0.0278$
$r_6 = 5.3789$
  $d_6 = 0.3891$  $n_4 = 1.7400$  $\nu_4 = 31.70$
$r_7 = 2.6409$
  $d_7 = 1.2507$  $n_5 = 1.4339$  $\nu_5 = 95.15$
$r_8 = -3.0545$
  $d_8 = 3891$  $n_6 = 1.7400$  $\nu_6 = 31.70$
$r_9 = -7.9648$
  $d_9 = 0.0278$
$r_{10} = 2.3300$
  $d_{10} = 1.5286$  $n_7 = 1.4970$  $\nu_7 = 81.61$
$r_{11} = -2.9050$
  $d_{11} = 1.9515$  $n_8 = 1.5085$  $\nu_8 = 60.83$
$r_{12} = 1.0087$
  $d_{12} = 1.2027$
$r_{13} = -5.3417$
  $d_{13} = 0.2233$  $n_9 = 1.6779$  $\nu_9 = 55.33$
$r_{14} = 1.5815$
  $d_{14} = 0.4725$  $n_{10} = 1.8052$  $\nu_{10} = 25.43$
$r_{15} = 6.8967$ $r_{I-2}/(n_{I-1} - 1) = \dfrac{r_2}{n_1 - 1} = -2.677$ $r_{IV-3}/(n_{IV-2} - 1) = \dfrac{r_{12}}{n_8 - 1} = 1.984$ $n_{I-1} = n_1 = 1.8830$
$d_{I-1} = d_1 = 0.5559$
$\nu_{II-p} = \nu_3$
$\nu_{III-p} = \nu_5$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the referece symbols $n_1, n_2, \ldots$ denote refractive indices of the respective lens elements and the reference symbols $\nu_1, \nu_2, \ldots$ represent Abbe's numbers of the respective lens elements.

Figure 1:
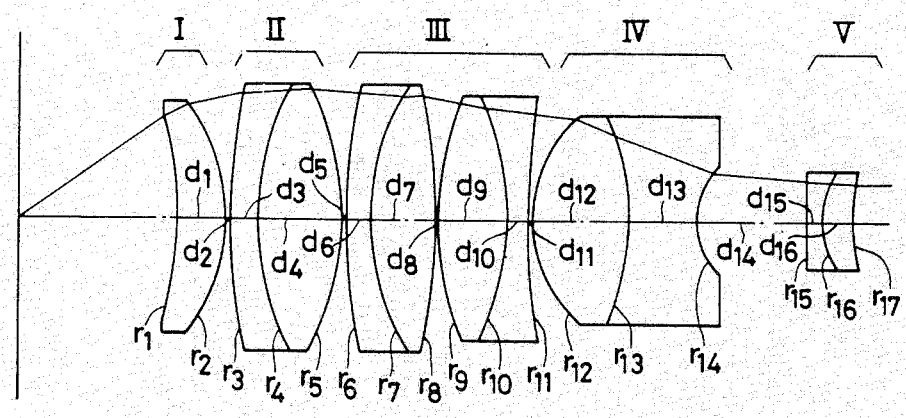
FIG. 1 shows a sectional view illustrating composition of Embodiment 1 of the objective lens system for microscopes according to the present invention.
Figure 2:
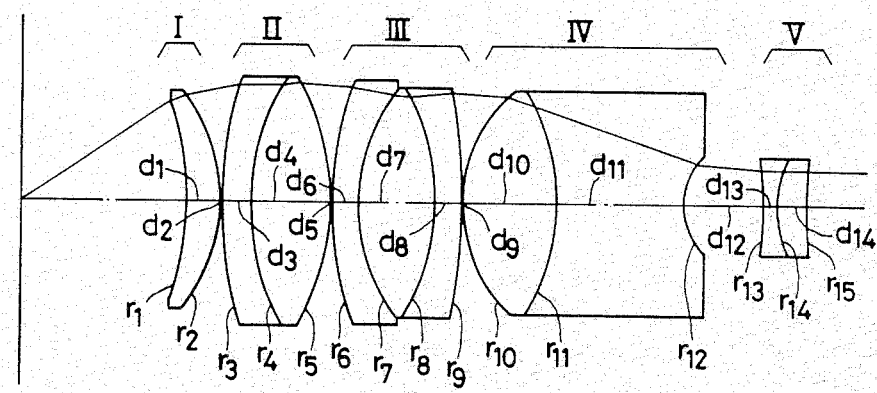
FIG. 2 shows a sectional view illustrating composition of Embodiment 2 of the present invention.

Out of the Embodiments described above, the Embodiment 1 has the lens composition shown in FIG. 1 in which the third lens unit III comprises two cemented doublets. The Embodiment 2 has the lens composition illustrated in FIG. 2 in which the third lens unit III comprises three cemented lens elements.

Figure 5:
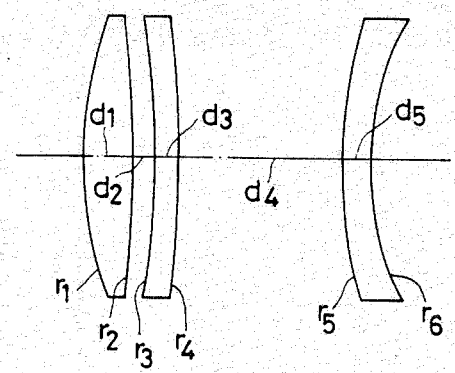
FIG. 5 shows a sectional view exemplifying an imaging lens system to be used in combination with the objective lens system for microscopes according to the present invention.
Figure 3:
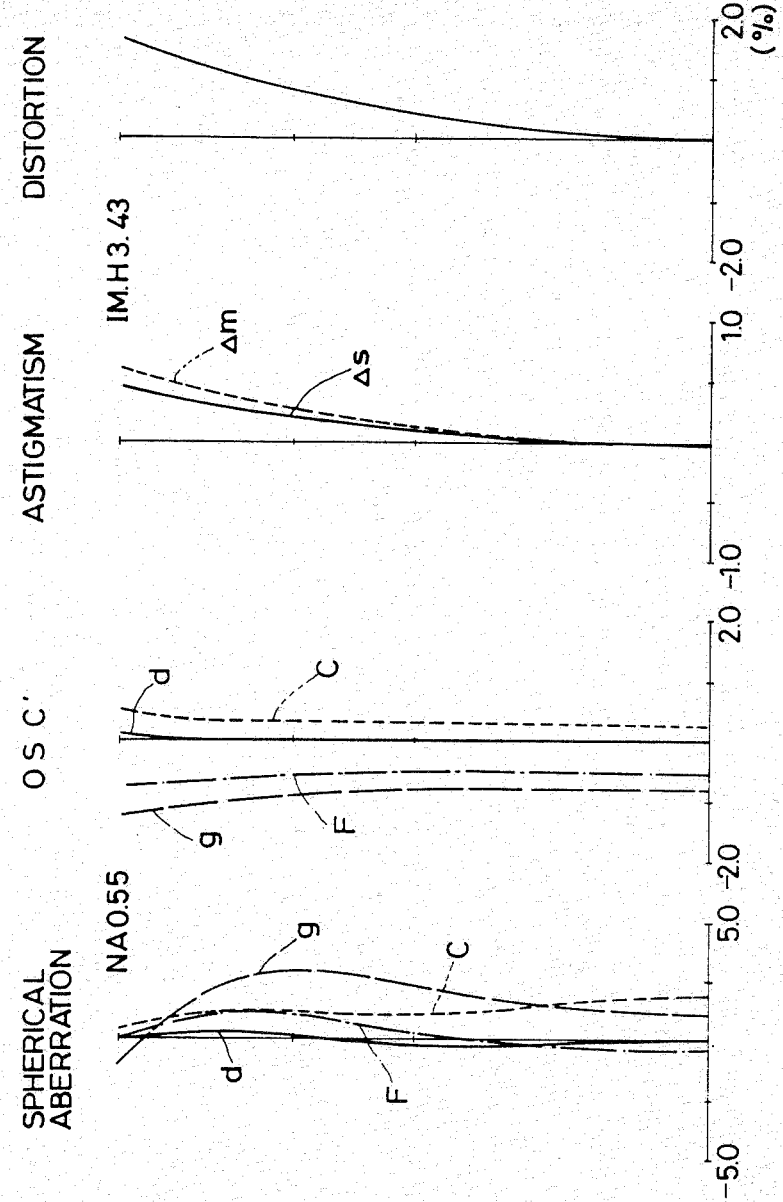
FIG. 3 shows curves illustrating aberration characteristics of the Embodiment 1.
Figure 4:
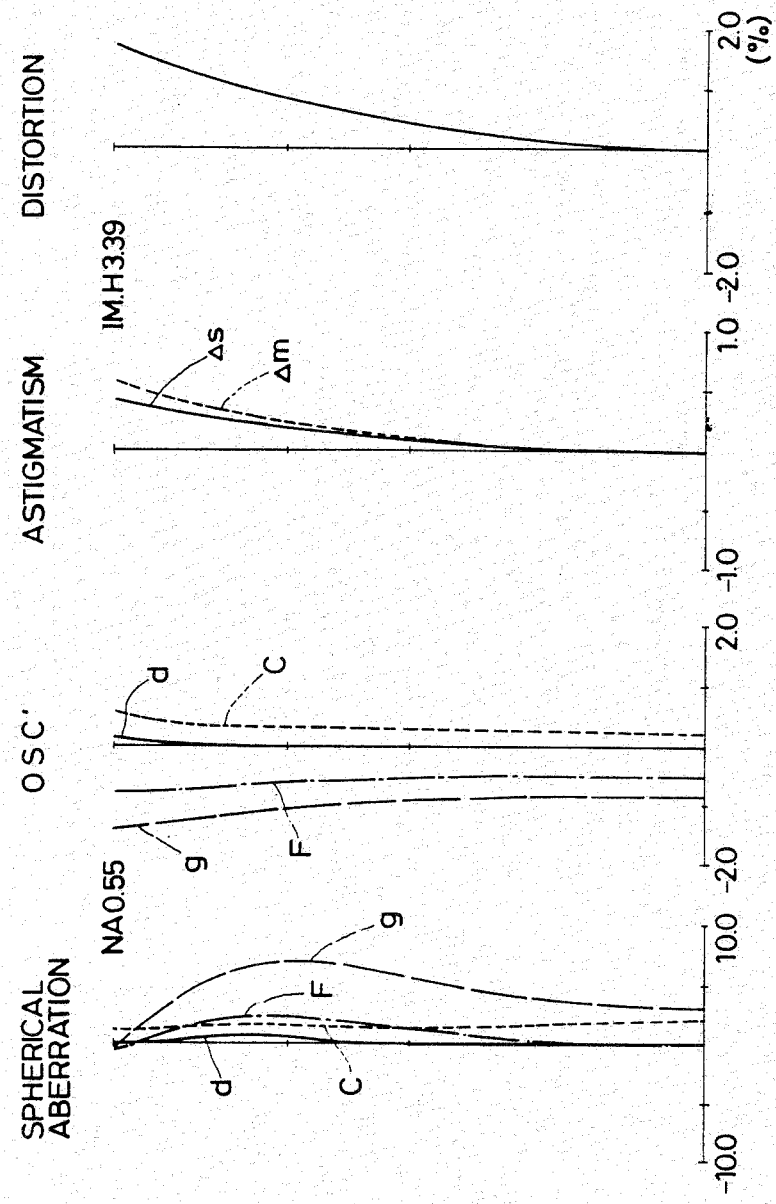
FIG. 4 shows curves illustrating aberration characteristics of the Embodiment 2.

Since both the Embodiments are designed as objective lens systems designed for infinity (lens systems so designed as to form images at infinite distance), said lens systems actually form no image. Therefore, the objective lens system according to the present invention is used in combination, for example, with an imaging lens system having the composition shown in FIG. 5 and the following numerical data $r_1 = 7.530$
  $d_1 = 1.020$  $n_1 = 1.4875$  $\nu_1 = 70.15$
$r_2 = -31.310$
  $d_2 = 0.510$
$r_3 = -14.668$
  $d_3 = 0.510$  $n_2 = 1.7400$  $\nu_2 = 28.29$
$r_4 = -31.179$
  $d_4 = 3.827$
$r_5 = 11.207$
  $d_5 = 0.459$  $n_3 = 1.4875$  $\nu_3 = 70.15$
$r_6 = 5.011$ The above-mentioned numerical data are given taking focal length f of the lens system of the Embodiment 1 as The aberration characteristics shown in FIG. 3 and FIG. 4 are illustrated as those of the Embodiments combined with the imaging lens system described above.

As is understood from the foregoing detailed descriptions and Embodiments, the objective lens system for microscopes according to the present invention has resolution equalled to that of the conventional objective lens systems having long working distances, a super-long working distance exceeding 8 mm which is longer than twice its focal length f and an image surface which is flat over a wide range up to field number 27. Further, the objective lens system described as the Embodiment 2 of the present invention comprises 10 lens elements since it adopts a lens component composed of three cemented lens elements, and assures favorably corrected aberrations.

I claim:

1. An objective lens system for microscopes comprising a first positive lens component, a second positive cemented doublet, a third lens unit comprising at least one cemented lens, a fourth meniscus cemented doublet component having a convex surface on the object side and a fifth negative cemented doublet component, said lens system being so designed as to satisfy the following conditions (1) through (4):

$$1.65 < n_{I-1} \quad (1)$$

$$-4.0f < r_{I-2}/(n_{I-1}-1) < -2.0f \quad (2)$$

$$d_{I-1} < 1.5f \quad (3)$$

$$1.8f < r_{IV-3}/(n_{IV-2}-1) < 2.2f \quad (4)$$

wherein the reference symbols represents focal length of said objective lens system as a whole, the reference symbol $n_{i-j}$ designates refractive index of the j th lens element of the i th lens component, the reference symbol $r_{i-j}$ denotes radius of curvature on the j th surface of the i th lens component and the reference symbol $d_{i-j}$ represents airspace reserved between the j th and j+1 th surfaces of the i th lens component.

2. An objective lens system for microscope according to claim 1 satisfying the following additional condition (5):

$$\nu_{II-p}, \nu_{III-p} \geq 80 \quad (5)$$

wherein the reference symbol $\nu_{i-p}$ represents Abbe's number of the positive lens elements arranged in the i th lens component.

3. An objective lens system for microscopes according to claim 2 wherein said third lens unit comprises two cemented doublets.

4. An objective lens system for microscopes according to claim 2 wherein said third lens unit comprises three cemented lens elements.

5. An objective lens system for microscopes according to claim 3 having the following numerical data:

| f = 1, NA = 0.55, WD = 2.529, β = −50X | | | |
|---|---|---|---|
| $r_1 = -5.1445$ | | | |
| $d_1 = 0.7502$ | | $n_1 = 1.8830$ | $\nu_1 = 40.76$ |
| $r_2 = -2.6127$ | | | |
| $d_2 = 0.0556$ | | | |
| $r_3 = 9.4957$ | | | |
| $d_3 = 0.3890$ | | $n_2 = 1.6510$ | $\nu_2 = 56.15$ |
| $r_4 = 3.9786$ | | | |
| $d_4 = 1.3337$ | | $n_3 = 1.4339$ | $\nu_3 = 95.15$ |
| $r_5 = -3.9786$ | | | |
| $d_5 = 0.0417$ | | | |
| $r_6 = 8.5713$ | | | |
| $d_6 = 0.3890$ | | $n_4 = 1.7400$ | $\nu_4 = 31.70$ |
| $r_7 = 3.6432$ | | | |
| $d_7 = 1.0003$ | | $n_5 = 1.4339$ | $\nu_5 = 95.15$ |

-continued

| $r_8 = -8.7233$ | | | |
|---|---|---|---|
| $d_8 = 0.0417$ | | | |
| $r_9 = 4.5349$ | | | |
| $d_9 = 1.1114$ | | $n_6 = 1.4339$ | $\nu_6 = 95.15$ |
| $r_{10} = -4.0600$ | | | |
| $d_{10} = 0.3334$ | | $n_7 = 1.6765$ | $\nu_7 = 37.50$ |
| $r_{11} = 11.4976$ | | | |
| $d_{11} = 0.0417$ | | | |
| $r_{12} = 2.0283$ | | | |
| $d_{12} = 1.5282$ | | $n_8 = 1.4970$ | $\nu_8 = 81.61$ |
| $r_{13} = -3.5343$ | | | |
| $d_{13} = 1.0044$ | | $n_9 = 1.5268$ | $\nu_9 = 51.12$ |
| $r_{14} = 1.0081$ | | | |
| $d_{14} = 1.7827$ | | | |
| $r_{15} = -36.1998$ | | | |
| $d_{15} = 0.2223$ | | $n_{10} = 1.6779$ | $\nu_{10} = 55.33$ |
| $r_{16} = 1.1298$ | | | |
| $d_{16} = 0.4724$ | | $n_{11} = 1.7847$ | $\nu_{11} = 25.71$ |
| $r_{17} = 3.2370$ | | | |
| $r_{I-2}/(n_{I-1}-1) = r_2/(n_1-1) = -2.959$ | | | |
| $r_{IV-3}/(n_{IV-2}-1) = r_{14}/(n_9-1) = 1.914$ | | | |
| $d_{I-1} = d_1 = 0.7502$ | | | |
| $n_{I-1} = n_1 = 1.8830$ | | | |
| $\nu_{II-p} = \nu_3$ | | | |
| $\nu_{III-p} = \nu_5, \nu_6$ | | | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces reserved therebetween, the reference symbols $n_1$ through $n_{11}$ represents refractive indices of the respective lens elements and the reference symbols $\nu_1$ through $\nu_{11}$ designate Abbe's number of the respective lens elements.

6. An objective lens system for microscopes according to claim 4 having the following numerical data:

| f = 1, NA = 0.55, WD = 2.547, β = −50x | | | |
|---|---|---|---|
| $r_1 = -4.4649$ | | | |
| $d_1 = 0.5559$ | | $n_1 = 1.8830$ | $\nu_1 = 40.76$ |
| $r_2 = -2.3644$ | | | |
| $d_2 = 0.0278$ | | | |
| $r_3 = 7.0069$ | | | |
| $d_3 = 0.3891$ | | $n_2 = 1.7000$ | $\nu_2 = 48.08$ |
| $r_4 = 3.4925$ | | | |
| $d_4 = 1.2507$ | | $n_3 = 1.4339$ | $\nu_3 = 95.15$ |
| $r_5 = -3.4925$ | | | |
| $d_5 = 0.0278$ | | | |
| $r_6 = 5.3789$ | | | |
| $d_6 = 0.3891$ | | $n_4 = 1.7400$ | $\nu_4 = 31.70$ |
| $r_7 = 2.6409$ | | | |
| $d_7 = 1.2507$ | | $n_5 = 1.4339$ | $\nu_5 = 95.15$ |
| $r_8 = -3.0545$ | | | |
| $d_8 = 0.3891$ | | $n_6 = 1.7400$ | $\nu_6 = 31.70$ |
| $r_9 = -7.9648$ | | | |
| $d_9 = 0.0278$ | | | |
| $r_{10} = 2.3300$ | | | |
| $d_{10} = 1.5286$ | | $n_7 = 1.4970$ | $\nu_7 = 81.61$ |
| $r_{11} = -2.9050$ | | | |
| $d_{11} = 1.9515$ | | $n_8 = 1.5085$ | $\nu_8 = 60.83$ |
| $r_{12} = 1.0087$ | | | |
| $d_{12} = 1.2027$ | | | |
| $r_{13} = -315.3417$ | | | |
| $d_{13} = 0.2223$ | | $n_9 = 1.6779$ | $\nu_9 = 55.33$ |
| $r_{14} = 1.5815$ | | | |
| $d_{14} = 0.4725$ | | $n_{10} = 1.8052$ | $\nu_{10} = 25.43$ |
| $r_{15} = 6.8967$ | | | |

$$r_{I-2}/(n_{I-1}-1) = \frac{r_2}{n_1-1} = -2.677$$

$$r_{IV-3}/(n_{IV-2}-1) = \frac{r_{12}}{n_8-1} = 1.984$$

$n_{I-1} = n_1 = 1.8830$
$d_{I-1} = d_1 = 0.5559$
$\nu_{II-p} = \nu_3$

-continued $$\nu_{III\text{-}p} = \nu_5$$

wherein the reference symbols $r_1$ through $r_{15}$ rerpresent radii of curvature on the surfaces of the respective lens elements, the reference symbols $d_1$ through $d_{14}$ designate thicknesses of the respective lens elements and airspaces reserved therebetween, the reference symbols $n_1$ through $n_{10}$ denote refractive indices of the respective lens elements and the reference symbols $\nu_1$ through $\nu_{10}$ represent Abbe's numbers of the respective lens elements.

* * * * *